V. AJELLO.
AEROPLANE.
APPLICATION FILED APR. 21, 1913.
1,230,641.
Patented June 19, 1917.
4 SHEETS—SHEET 4.
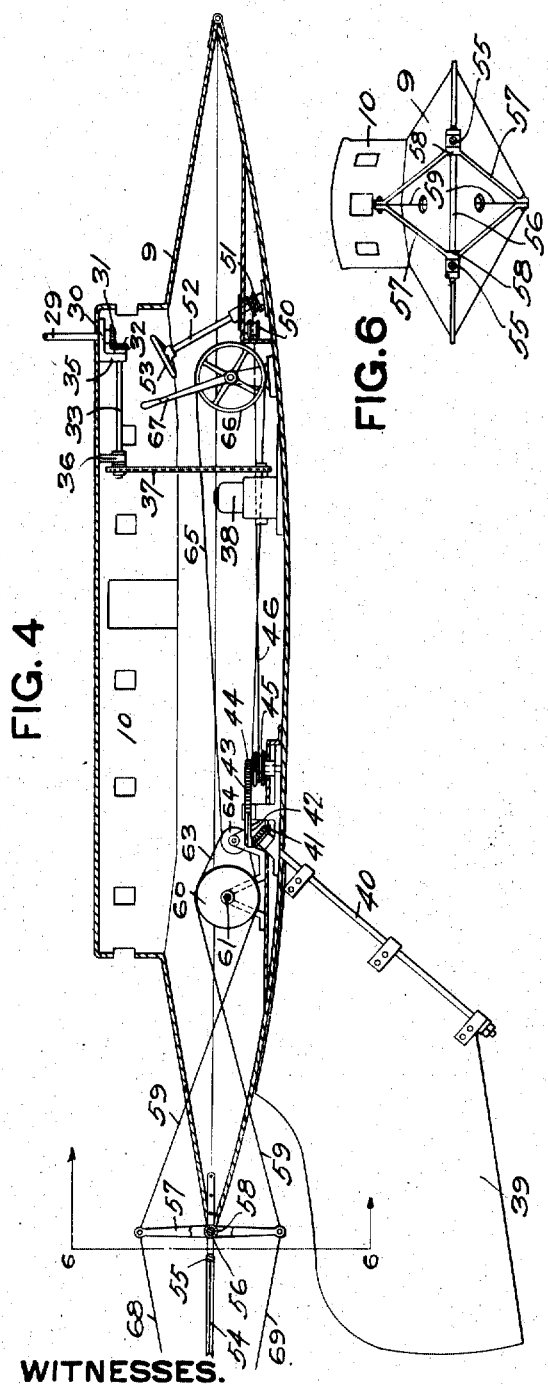
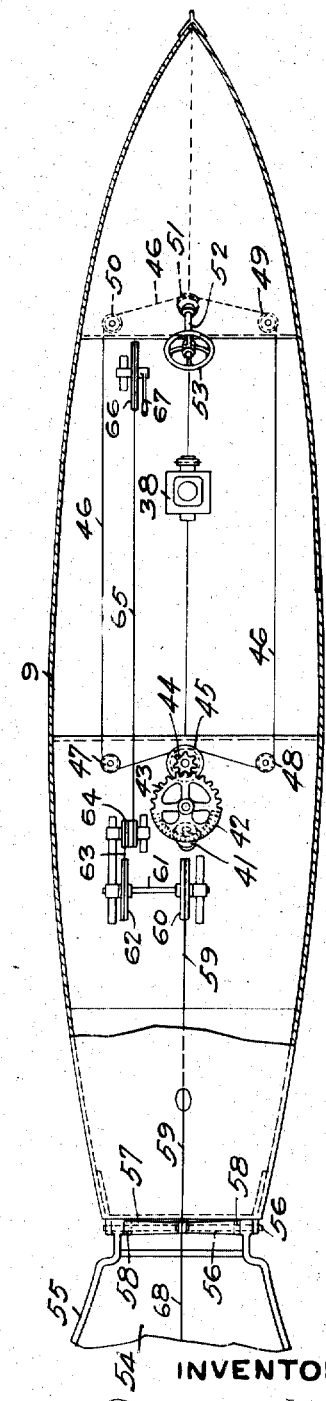
WITNESSES.
J. R. Keller
Robert C. Totten
INVENTOR.
Vincent Ajello
By Kay & Totten
Attorneys

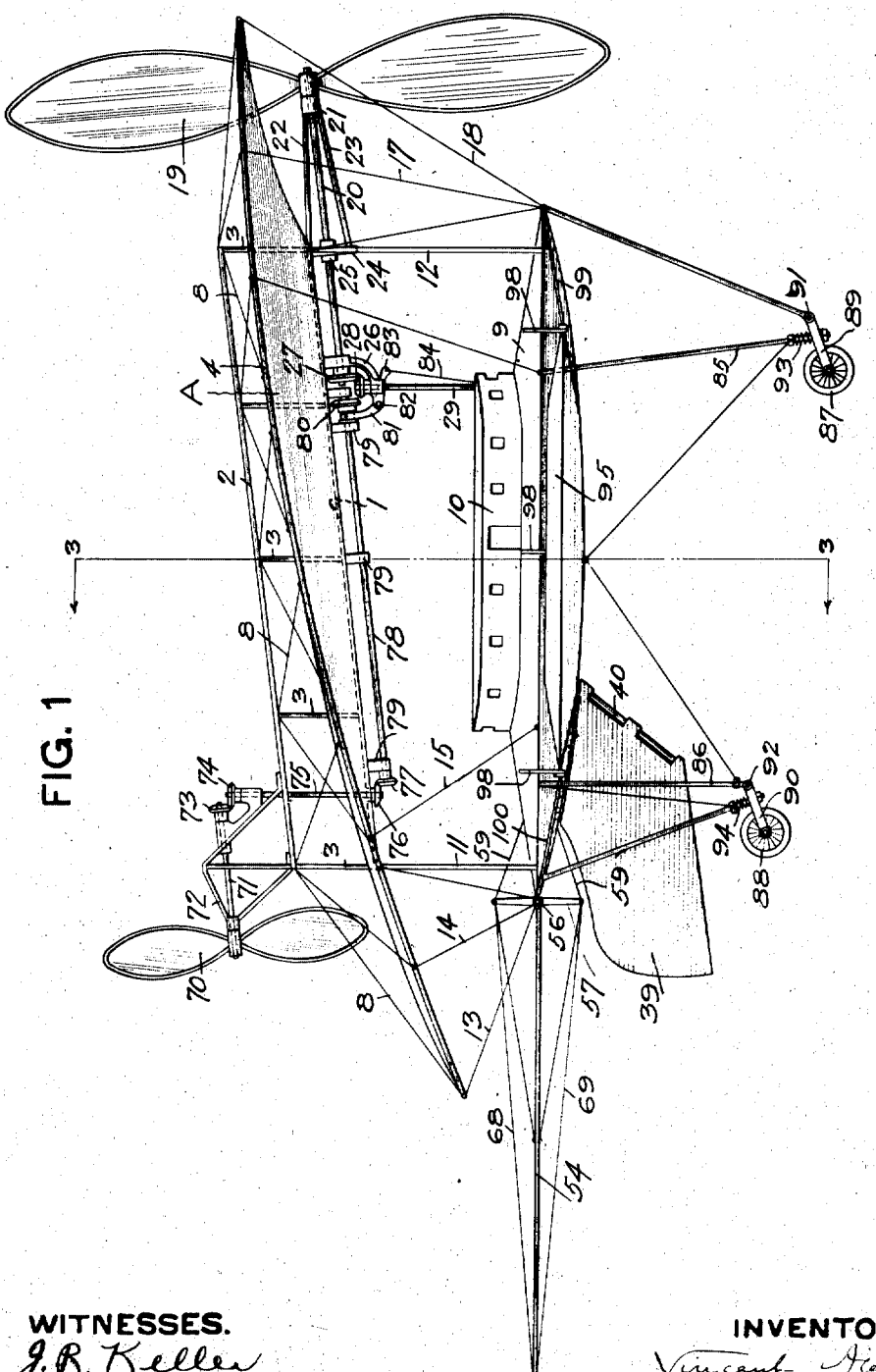

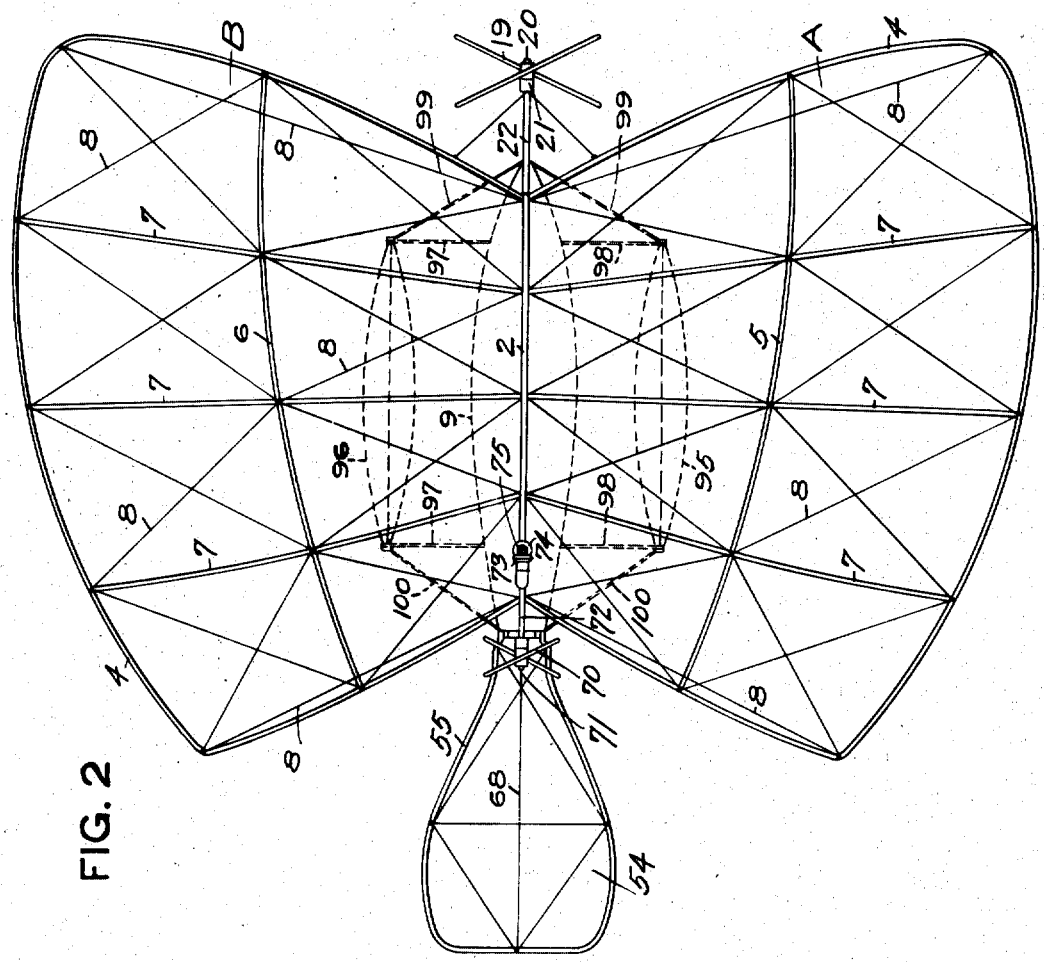

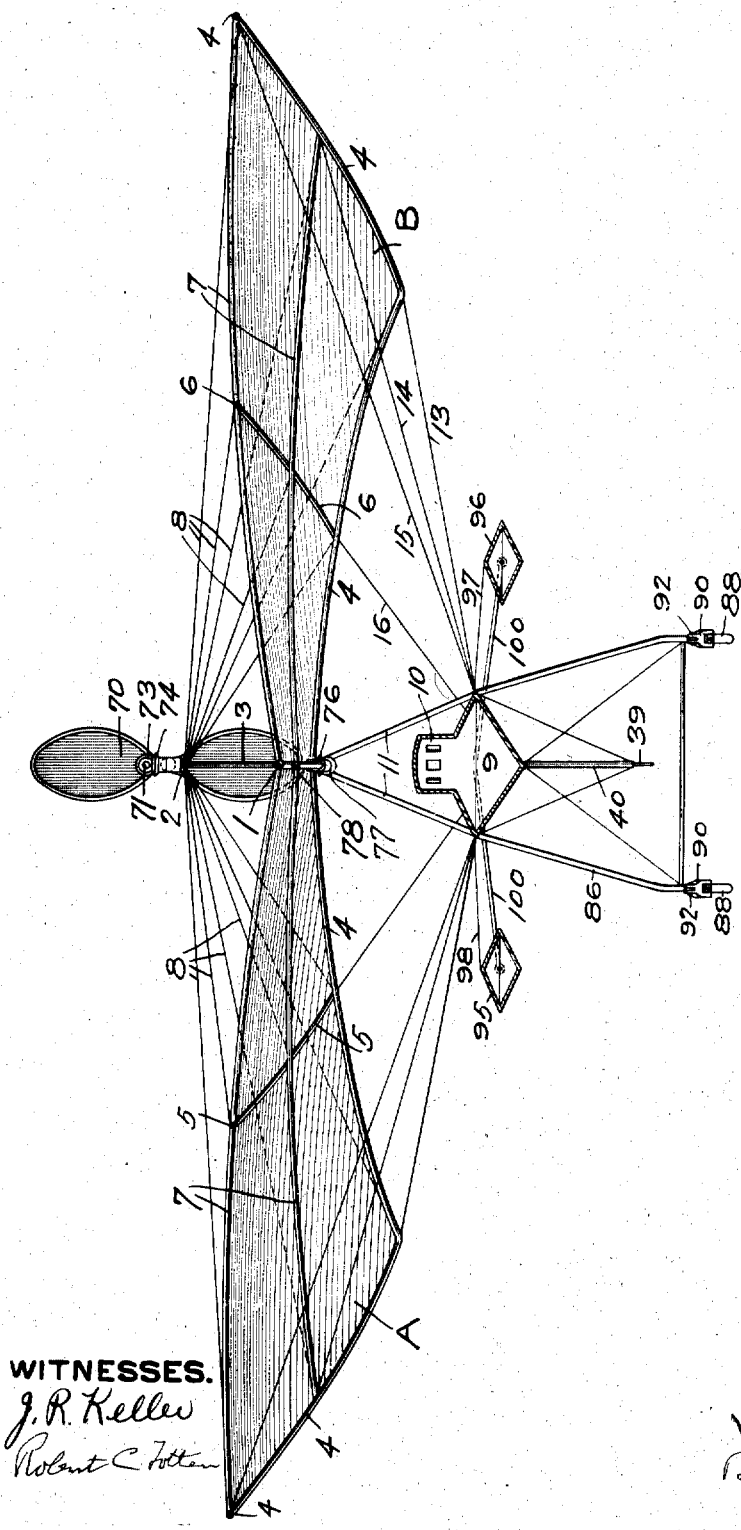

UNITED STATES PATENT OFFICE.

VINCENT AJELLO, OF PITTSBURGH, PENNSYLVANIA.

AEROPLANE.

1,230,641. Specification of Letters Patent. Patented June 19, 1917.

Application filed April 21, 1913. Serial No. 762,591.

*To all whom it may concern:*

Be it known that I, VINCENT AJELLO, a citizen of the United States, and resident of Pittsburgh, in the county of Allegheny and State of Pennsylvania, have invented a new and useful Improvement in Aeroplanes; and I do hereby declare the following to be a full, clear, and exact description thereof.

My invention relates to aeroplanes or heavier than air flying machines, and it has for its object to provide a machine of this character in which the sustaining planes or wings are best adapted not only for rapid flight and for easy manipulation and turning of the machine, but also said wings or planes are so constructed that should the motive power of the aeroplane break down, or be otherwise thrown out of commission, the machine will not become unmanageable, nor will it descend too rapidly for safety. In other words, the wings or planes are so constructed, shaped and disposed that they as a whole will act in a manner similar to a parachute, thus permitting the machine to descend when not under motive power, gradually and under perfect equilibrium. This parachute action is also secured by the manner in which the weight of the body of the machine is disposed with respect to the planes, as hereinafter described.

A further object is to position the motive means or propellers at the most effective points with respect to the wings or planes, so that said propellers not only carry the machine forward, but will also aid in the sustaining action of the machine by reason of the manner of impact of the air displaced by the propellers with respect to the planes. A further object is to provide the machine with what may be termed an emergency propeller, the purpose of which is to carry the machine forward when the main driving propeller is disabled. A further object is to so construct this emergency propeller that its wings may be folded fore and aft when it is not in commission and thus it will not oppose the forward movement of the machine under impulse of the main propeller. A further object is to provide the machine with a passenger carrying body adapted to accommodate not only the operator, but several passengers in which body also the driving motor, steering mechanism and other operating parts of the aeroplane may be mounted for convenient operation. A further object is to provide in conjunction with the main carrying body laterally disposed floats arranged respectively somewhat after the manner of the hulls of a catamaran whereby should the machine light upon water it will be sustained in perfect equilibrium and will not rock laterally owing to the lateral extent of the wings or planes. A further object is to provide a machine with conveniently operable steering apparatus whereby its course may be effected upward, downward or to either side. The machine may also be provided with a suitable wheeled carrier thus enabling it to run along the ground in starting or lighting and for convenient shifting from place to place.

With these and other objects in view which will appear from the detail description, the invention consists in a construction and arrangement of parts, a preferred embodiment of which is illustrated in the accompanying drawings in which Figure 1 is a side elevation of an aeroplane embodying the invention. Fig. 2 is a plan view thereof; Fig. 3 is a transverse sectional view on the line 3—3 Fig. 1 looking to the rear; Fig. 4 is a longitudinal sectional view of a carrier body or hull showing the rudder operative mechanism therefor in elevation. Fig. 5 is a horizontal sectional view of the hull or body portion; and Fig. 6 is a sectional view on the line 6—6 Fig. 4 of the details of the steering apparatus.

Referring to Figs. 1, 2 and 3 which show the construction and arrangement of the sustaining planes or wings. The sustaining members comprise a central longitudinally disposed truss frame or backbone consisting of a lower or main chord 1 and an upper chord 2 which are connected together by stanchions 3, 3. To this lower chord 1 of the central truss frame are secured the wings of planes A and B each one comprising a peripheral frame member 4 which determines the size and shape of each sustaining plane. Between the central truss frame and the outer extremities of the wing frames are fore and aft strengthening members 5 and 6 and the plane frames are braced laterally by a plurality of strut members 7, three being shown for each wing Fig. 2 of the drawing. These strut members 7 are secured firmly to the central truss frame and to the longitudinal truss members 5 and 6 as well as to the peripheral frame 4 of the wings in any suitable manner. These wing or plane frames and consequently the wings or sustaining planes themselves are curved fore and aft, as clearly shown in Fig. 1 and also laterally from the central truss frame as shown in Fig. 3, so that the central areas of each of the wings or planes are upwardly curved thus providing substantially pockets on their under sides which serve to transmit the sustaining action of these wings to their central areas in much the same manner as the sustaining action of a parachute is concentrated largely at the center of its sustaining member. This parachute action therefore of the wings or sustaining planes of this machine serves to maintain the entire machine in perfect equilibrium when the motive power is shut off or is otherwise thrown out of commission so that the machine as a whole cannot tip in any direction and thus fall with great velocity, as in the case of aeroplanes as ordinarily constructed. The shape of the planes also is such that their greatest spread is at or substantially at their forward ends while their rear ends are tapered. The entire spread of the wings thus forms in effect a triangle with its base at the front and its apex at the rear of the machine, so that the greatest sustaining action of the planes is effected while the front and the rear ends of the wings or planes do not oppose a drag to the forward movement usually found in aeroplanes as ordinarily constructed. The outer edges of the planes are connected with the upper chord or truss member 2 of the central truss frame by means of numerous stay wires 8 which not only extend laterally from the central truss frame, but also diagonally to the front or rear, so that the wings or planes are securely held against movement with respect to the central truss frame.

The wing frames may be covered with any suitable fabric such as oiled silk or like light but strong material, and if desired, said wings or plane frames may be double or each consists of two superposed frames joined at their outer edges but spaced apart as they approach the central truss frame, thus forming planes or wings of substantially truss form but having thin or reduced edges so as to present a cutting edge to the air.

Beneath the central truss frame is suspended a passenger carrying body or main hull 9 as it may be called, which may be of hollow and buoyant construction and adapted to act as a float when the machine alights upon a body of water. This hull may if desired be provided with a cabin portion 10 giving ample headway to the occupants. This hull or body portion is suspended from the main truss frame by means of rigid stanchions 11 and 12 and may be suitably stayed laterally by additional stanchions or strut members as desired. The outer edges of the wings or sustaining planes are also connected with this hull or body portion by means of suitable stay wires 13, 14, 15, 16, 17 and 18 whereby the edges of the wings are rigidly held in position with respect to the body or hull and the proper curvature of the wings is maintained for the purposes hereinafter described.

In order to drive the vessel or machine forward a suitable propeller 19 is provided which is secured to a shaft 20 journaled at its forward end in a bracket 21 which is rigidly secured to the central truss frame by means of stay pieces 22 and 23 the latter extending forward from a bracket 24 depending from the truss frame within which bracket also is a second bearing or journal 25 for the shaft 20. The rear end of the shaft 20 is journaled in a curved bracket 26 depending from the truss frame and the shaft 20 is provided at its rear end with a beveled gear 27 adapted to mesh with a second beveled gear 28 on the upper end of a vertical shaft 29 which in turn is journaled in the bracket 26 and in a suitable bearing 30 Fig. 4 within the hull or carrying body 9. The lower end of the shaft 29 may be provided with a beveled gear 31 meshing with a gear 32 on the forward end of a shaft 33 journaled in bearing brackets 35 and 36 secured within the hull and the rear end of the shaft 33 is connected by sprocket chains 37 with any suitable form of motor 38 located within the hull or body 9.

Although I have herein indicated an arrangement of driving mechanism for the machine, it is to be understood that my invention is not limited to this form but may be varied to any desired extent within the scope of the invention.

It will be noticed that the main propeller 19 is mounted on the central axis of the supporting planes and that in the normal horizontal position of the machine the shaft of the propeller is tilted slightly upwardly so that the propeller not only has a forward driving action, but also a lifting action. It will also be seen by an inspection of Fig. 1 of the drawings that in this normal horizontal position of the machine as a whole the sustaining wings or planes are depressed somewhat at the rear so that the natural tendency of the air pressures upon the machine when moved forward under its motive power will be to cause the machine to rise, and the pressure of the air as it passes from front to rear end the under surface of the planes will exert an upward pressure on the rear ends of the wings so that the resultant of all the air pressures on the under side of the planes when properly counterbalanced by the remaining parts of the machine will be to maintain the machine in suitable substantially horizontal equilibrium by which the car or carrying body may at all times be in horizontal position even when the machine is ascending. Also it will be observed that the portions of the wings or planes adjacent the central truss frame or backbone of the machine are depressed slightly, so that the lateral air pressures exerted against the wings will serve to maintain the lateral equilibrium of the machine. It is to be borne in mind also that the wings are of such shape as before indicated that the sustaining surface on the under side is convex both fore and aft and laterally so that the planes may act as a parachute when the motor is stopped thus imparting a more effective floating function to the machine and permitting it to alight gradually and lightly.

From an inspection of Fig. 2 showing a plan view of the machine it will be seen that the wings are of considerably greater length fore and aft at their outer edges than at their inner edges where they join the central truss frame. By this construction very much greater lateral equilibrium is secured as the weight of the machine is largely concentrated along the central truss frame and the center of gravity of the machine is immediately below said frame. It is to be understood that the position of the weight of the carrying car, motors, and operating parts is such that they are exactly balanced beneath the planes when the motor is not in operation and the machine is floating in the air. Moreover the decreased area of the rear ends of the wings as compared with the forward ends is compensated for by the greater convexity or downward curvature of the wings at the rear. At the same time the lesser area of the wings at the rear diminishes the drag or retarding effect of the rear ends of the wings upon the forward motion of the machine.

In order to guide the machine laterally a vertical steering rudder 39 is provided which is mounted on a forwardly inclined rudder post 40 so that when the rudder is thrown to one side or the other, it will not only deflect the course of the machine laterally, but will also impart to it a slight inclination in the direction in which it is turning and thus enable the wings or planes more effectually to oppose their surfaces to the air and aid in the quick turning of the apparatus. The rudder 39 may be operated in any suitable and convenient manner, but as here shown its post 40 is provided with a beveled gear 41 within the carrying body which is engaged by a bevel crown gear 42 having peripheral teeth 43 throughout a considerable segment thereof adapted to be engaged by a pinion 44 on a tiller post which has also a tiller pulley 45 around which several turns of a tiller rope are wrapped. For convenient disposition of the tiller rope within the carrying body the same is passed around guide pulleys 47, 48 and is carried forward around similar guide pulleys 49, 50 at the forward end of the car body and thence is given several turns around a drum 51 on a steering shaft 52, the latter being provided with a suitable steering gear or wheel 53 for convenient manipulation by the operator.

In addition to the lateral steering means just described the machine is provided with a deflecting plane 54 which consists of a peripheral frame 55 of substantially the shape shown in Fig. 2, said frame members being pivoted upon a transverse shaft 56 secured to the rear end of the car body 9. The deflecting plane may be operated in any suitable manner but as here shown is preferably provided with a vertical cross head 57 which may be secured to sleeve 58 mounted upon the pivot shaft 56, said sleeve being secured to the inner ends of the frame member 55 of the deflecting plane 54. From the upper and lower ends of the steering cross head 57 a tiller rope or cord 59 is carried to a steering drum 60 rigidly mounted upon a shaft 61 upon which shaft also is a second pulley 62 connected by an operating cord 63 with a smaller or differential pulley 64. The latter is connected by tiller rope 65 with a tiller wheel 66 at the forward part of the carrying car and adjacent the steering head 53 the shaft of the tiller wheel 66 having rigidly mounted thereon an operating lever 67 so that the controlling means both of the lateral guiding rudder and of the deflecting plane are brought within convenient reach of a single operator. From cross head 52 stay cords 68 and 69 extend to the outer extremities of the deflecting plane 54.

In cases of emergency caused by any breaking down of the forward or main propeller 19 it may be desirable to have means for imparting headway to the machine sufficient to carry it to a convenient alighting place, or a fair green free of obstructions such as trees, houses, etc.

To these ends I provide an emergency propeller 70 at the rear of the machine mounted upon a shaft 71 journaled in a suitable frame 72 carried by the rear end of the main truss frame of the machine. The wings of this propeller may be provided with any suitable connections with its shaft whereby said wings may be folded or extended parallel longitudinally to the rear when the propeller is not in use and means may be provided by which these wings may be extended to operative position as shown in Fig. 1. Any suitable mechanism for this purpose may be provided. This emergency propeller is operated through a gear 73 on the shaft 71 meshing with a corresponding gear 74 on a vertical shaft 75 journaled in the central truss frame which shaft is geared as at 76, 77 to a shaft 78 carried in journal brackets 79 of the truss frame. At the forward end of the shaft 78 is a sliding gear 80 which is splined to said shaft and is provided with a clutch sleeve engaged by an actuating arm 81 pivoted at 82 on the bracket 26 and having an operating arm 83 provided with an operating cord 84 which is carried to within convenient reach of the operator in the carrying body 9 so that the gear 80 may be thrown into operative engagement with the motor of the machine at will. Thus when the main propeller 19 is thrown out of commission for any reason, the emergency propeller may be brought into commission and the machine brought to a suitable landing place.

To enable the machine to move along the ground either in starting or alighting I provide the usual trucks 85, 86 at front and rear of the main body of the machine each having the running wheels 87 and 88. These wheels are not mounted rigidly upon the trucks, but are carried in frames 89 and 90 pivoted at 91 and 92, respectively, on the truck frames and having bearing springs 93, 94 which serve to ease the jar of impact of the machine upon the ground.

It is desirable also to provide efficient means for maintaining suitable equilibrium of the machine when it alights upon a body of water. To this end I provide upon the opposite sides of the main body the auxiliary floats 95 and 96, Figs. 2 and 3 consisting of suitable frames over which any durable and water proof material may be stretched. These floats are secured by stay members 97 and 98 to the main carrying body 9 being held rigidly with respect thereto by means of wires or rods 99 and 100. These auxiliary floats therefore operate substantially in the manner of the companion hulls of a catamaran and serve to counterbalance the lateral extension of the supporting wings or planes so that the machine may float in stable equilibrium upon any body of water.

While I have herein described a particular embodiment of my invention and a particular construction and arrangement of parts, it is to be understood that the apparatus may be varied in details in the relative arrangements of parts within the scope of the appended claims.

What I claim is:

1. In an aeroplane, the combination with a central fore and aft main or truss frame having a carrying body suspended therefrom, sustaining planes extending to either side of said main frame, a driving propeller at the forward end of the axis of said plane and an auxiliary propeller above the rear end of said frame, a motor within said carrying body and an operative connecting member adapted to connect said motor with one or the other of said propellers respectively.

2. In aeroplanes, the combination with a rigid central fore and aft main or truss frame having a passenger carrying body suspended from the fore and aft median line thereof, rigid sustaining planes rigidly connected with said truss frame and extending to either side thereof, a driving propeller at the forward end of the axis of said frame, and an auxiliary propeller carried by and extending above the rear end of said frame, a motor within said carrying body and an operating member arranged to connect said motor either with said forward propeller or said rear propeller at will and longitudinal floats located at either side of and spaced away from said main passenger carrying member, and in substantially the same horizontal plane therewith, whereby the machine may also be sustained in stable equilibrium upon a body of water.

3. In an aeroplane, the combination with a main frame having a carrying body suspended therefrom, said body having lateral floats secured thereto, and extending parallel therewith upon either side, a pair of sustaining planes extending laterally from said main frame, said planes each being concavo-convex in form and inclined upwardly and outwardly from said frame at their forward ends, a driving propeller mounted upon the forward end of the axis of said planes, an auxiliary propeller mounted at the rear end of said frame and above and to the rear of said plane, horizontal and vertical deflecting planes mounted at the rear end of said carrying body, a driving motor and steering apparatus connected with said propellers and said deflecting planes, respectively, located within said carrying body.

In testimony whereof, I the said VINCENT AJELLO have hereunto set my hand.

VINCENT AJELLO.

Witnesses:
ROBERT C. TOTTEN,
JOHN F. WILL.